(12) United States Patent
Willim

(10) Patent No.: US 9,701,477 B2
(45) Date of Patent: Jul. 11, 2017

(54) TOOL FOR LIFTING A TOILET

(71) Applicant: Darrell Willim, Winnipeg (CA)

(72) Inventor: Darrell Willim, Winnipeg (CA)

(*) Notice: Subject to any disclaimer, the term of this patent is extended or adjusted under 35 U.S.C. 154(b) by 0 days.

(21) Appl. No.: 14/903,218

(22) PCT Filed: May 14, 2014

(86) PCT No.: PCT/CA2014/050452
§ 371 (c)(1),
(2) Date: Jan. 6, 2016

(87) PCT Pub. No.: WO2015/003258
PCT Pub. Date: Jan. 15, 2015

(65) Prior Publication Data
US 2016/0318711 A1    Nov. 3, 2016

Related U.S. Application Data

(60) Provisional application No. 61/866,276, filed on Aug. 15, 2013, provisional application No. 61/843,617, filed on Jul. 8, 2013.

(51) Int. Cl.
*B65G 7/12*    (2006.01)
(52) U.S. Cl.
CPC ..................... *B65G 7/12* (2013.01)
(58) Field of Classification Search
CPC .......... B65G 7/12; A45F 5/10; B25J 15/0047; B66C 1/54
USPC ...... 294/15, 16, 34, 92, 93, 103.1, 145, 158, 294/166; 211/105.5, 105.6
See application file for complete search history.

(56) References Cited

U.S. PATENT DOCUMENTS

| | | | | |
|---|---|---|---|---|
| 1,655,744 A | * | 1/1928 | Swanby | H01M 2/1005 16/423 |
| 1,689,044 A | * | 10/1928 | Meyer | A47J 45/075 16/425 |
| 2,519,996 A | * | 8/1950 | Blake | A47H 1/022 211/105.6 |
| 2,566,507 A | * | 9/1951 | Walraven | B25B 27/06 29/283 |
| 3,262,590 A | | 7/1966 | Lynn | |
| 3,391,905 A | * | 7/1968 | Burns | B62B 3/0625 212/901 |

(Continued)

FOREIGN PATENT DOCUMENTS

| | | |
|---|---|---|
| CN | 2561983 | 7/2003 |
| GB | 2416905 | 2/2006 |

*Primary Examiner* — Dean Kramer
(74) *Attorney, Agent, or Firm* — Kyle R. Satterthwaite; Ryan W. Dupuis; Ade & Company Inc.

(57) ABSTRACT

Described is a tool for lifting a toilet. The tool features a handle insertable into the toilet bowl in a position placing opposing ends of the handle beneath the toilet bowl rim at opposing sides of the toilet bowl, such that lifting of the handle acts to lift up the toilet via the toilet bowl rim. In some embodiments, the handle is longitudinally extendable and collapsible between an extended position and a collapsed position to aid in placement of the handle into the lifting position, and is spring-biased into the extended position to prevent inadvertent collapse of the handle while lifting or transporting the toilet. Other embodiments include a fixed-length disposable handle secured to the toilet by tie members engaged through toilet-seat mounting holes therein.

27 Claims, 7 Drawing Sheets

(56) References Cited

U.S. PATENT DOCUMENTS

| | | | |
|---|---|---|---|
| 3,972,104 A * | 8/1976 | Partin | B25B 27/02 |
| | | | 29/280 |
| 5,203,065 A | 4/1993 | Peters | |
| 5,373,593 A | 12/1994 | Deckey | |
| 5,520,326 A | 5/1996 | Schmidt | |
| 5,660,422 A * | 8/1997 | Knisley | B66C 1/54 |
| | | | 294/67.33 |
| 5,873,616 A * | 2/1999 | Kirschbaum | A45F 5/10 |
| | | | 294/150 |
| 5,971,457 A * | 10/1999 | Gallo, Jr. | B66C 1/54 |
| | | | 294/110.1 |
| 6,015,137 A | 1/2000 | Guevara et al. | |
| 6,135,466 A | 10/2000 | Irwin | |
| 6,571,426 B2 * | 6/2003 | Chen | A47B 61/003 |
| | | | 16/87 R |
| 6,685,170 B1 | 2/2004 | Gwynn | |
| 6,886,192 B1 * | 5/2005 | Merrill | B62B 3/10 |
| | | | 254/7 R |
| 7,134,151 B1 | 11/2006 | Charamie | |
| 2007/0022674 A1 * | 2/2007 | Worthington | E04G 21/16 |
| | | | 52/122.1 |
| 2007/0057476 A1 * | 3/2007 | Decky | B62B 1/002 |
| | | | 280/47.28 |

* cited by examiner

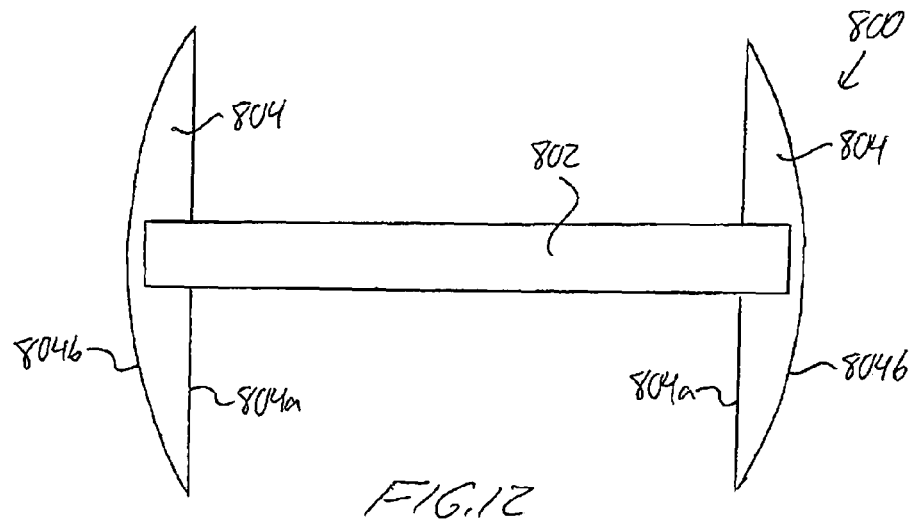
FIG. 12
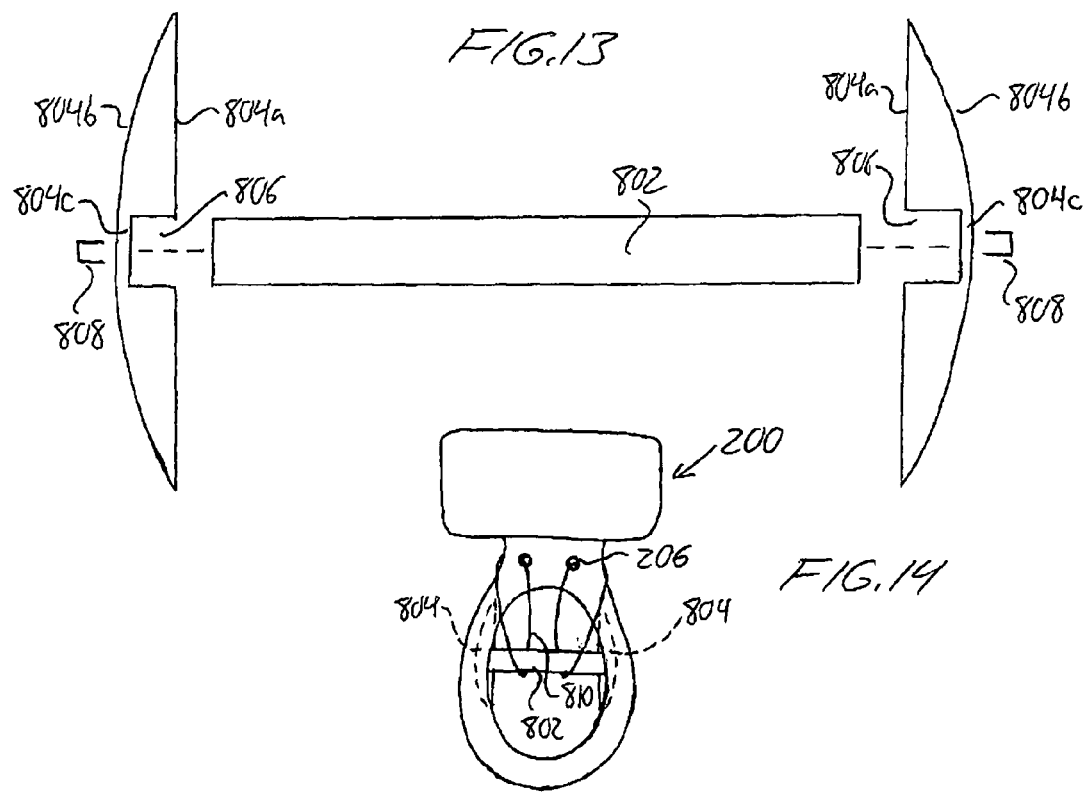
FIG. 13
FIG. 14

TOOL FOR LIFTING A TOILET

FIELD

This disclosure relates, in general, to the field of tools and more particularly to the field of tools to aid in lifting toilets.

BACKGROUND

Toilets are generally quite heavy and of an awkward shape and size, making them difficult to lift and maneuver. Installation of toilets involves lowering the toilet vertically onto two upstanding T-bolts that project up from a flange around a drain pipe opening in the floor. Depending on the weight and design of the toilet, it can often be difficult to grasp and lift the toilet, making transport and installation of the toilet difficult. A variety of tools and devices have been developed to aid in the lifting and transport of toilets, specific examples of which are discussed below.

U.S. Pat. No. 3,262,590 describes a device for lifting and transporting a toilet, comprising a lifting jack arranged to engage the rim of the toilet, wherein the lifting jack is supported by a wheeled support frame.

U.S. Pat. No. 5,556,076 describes a toilet lifting and transporting device constructed from a piece of hollow steel tubing which is bent to define a U-shaped base frame, with a pair of wheels mounted adjacent the ends thereof, having a pair of support legs extending upwardly from the sides of the base frame at substantially right angles thereto.

U.S. Pat. No. 6,685,170 describes a collapsible toilet lifting and transporting device. The device has a support structure with three vertical legs with wheels on the bottoms and horizontal support structures connecting the legs at the tops. The strap system includes a loop that engages the bowl of a toilet and rear straps that engage the back of the toilet.

U.S. Pat. No. 6,752,379 describes an adjustable toilet dolly having a wheeled U-shaped frame that slides around either side of a toilet bowl. The dolly further comprises jack screws that can be adjusted to lift the toilet for transport.

U.S. Pat. No. 6,886,192 describes a toilet lifting and transport device having forward and rear legs, which can be coupled to a toilet fixture through use of a tank strap and bridge straps. The toilet is lifted through use of a screw lift.

U.S. Pat. No. 7,134,151 describes a wheeled toilet transporting frame that can be broken down and folded for storage and transport.

U.S. Pat. No. 7,798,469 describes an apparatus for lifting and transporting a toilet comprising a base frame having three sides and a lift frame pivotally attached to one end of the base frame. The apparatus further comprises a jack device attached to the lift frame for lifting the toilet.

U.S. Pat. No. 7,841,028 describes a toilet moving device comprising a dolly that can be inserted under a front of a toilet pedestal to assist in lifting of the toilet. A base is coupled to the dolly and a lifting assembly, which engages the tank of a toilet, is coupled to the base.

US 2007/0057476 describes a wheeled cart having a lift mechanism that is arranged to engage a toilet rim and facilitate lifting and transport of the toilet.

US 2007/0256238 describes a toilet moving apparatus having a base portion, at least two toilet lifting members configured for positioning underneath the bowl portion of the toilet, a toilet securing member extending upward from the base portion that is designed to fit over the rim of the toilet bowl, and a lifting mechanism.

US 2008/0109957 describes a toilet lifting and transporting apparatus comprising a frame with a pair of side members, a bracing mechanism, wheels, and a rotatable lifting arm.

US 2012/0187357 describes a wheeled toilet dolly for lifting a toilet from the floor, the dolly having a frame including a pair of spaced apart members that are positionable on opposite sides of the toilet, and bowl lifting portions operated by a lever assembly.

A further toilet-engaging device is described in U.S. Pat. No. 4,112,527. This patent describes a temporary toilet bowl stopper that is adapted for installation into the open top of a toilet bowl to stop back flow from a connected sewer.

While a number of toilet lifting devices have been described, there remains a desire for a toilet lifting tool that is space-saving and that can readily be installed onto and removed from a toilet as needed.

SUMMARY

According to a first aspect of the invention, there is provided a device to aid lifting or transporting of a toilet, the toilet having a bowl with a rim, said device comprising a handle assembly that is longitudinally extendable and collapsible between an extended position and a collapsed position, wherein the device comprises opposite ends separated by the length of the handle assembly, and wherein each end of the device is arranged to engage an inner surface of the toilet bowl and/or to engage an underside of the rim of the toilet bowl when the device is installed within the toilet bowl in the extended position, the engagement between the device and the inner surface of the toilet bowl and/or the rim of the toilet bowl sufficient to enable a user to lift or transport the toilet by applying upward pressure to the device.

Preferably, the handle assembly is biased towards the extended position.

Alternatively, the device may comprise a releasable locking member to enable the device to be releasably locked in the extended position.

Preferably, the handle assembly is a telescopic handle assembly.

Preferably, the device comprises: (a) a tube; (b) a rod, said rod having a first end received within the tube and a second end external to the tube; and (c) a compression spring housed within the tube, said compression spring having opposite first and second ends, wherein the first end of the compression spring engages the rod, wherein the rod is longitudinally slidable along the length of the tube between a retracted position and an extended position, and wherein the compression spring biases the rod towards the extended position.

There may be provided a stop located within the tube at a position intermediate between the ends of the tube, said stop arranged to engage the second end of the compression spring.

In one embodiment, the device comprises: first and second rods, each rod having first and second opposite ends, the first end of the first rod being received by a first end of the tube and the first end of the second rod being received by a second end of the tube; a stop, said stop located within the tube at a position intermediate between the first and second ends of the tube; and first and second compression springs, the first compression spring located within the tube on a same side of the stop as the first rod and the second compression spring located within the tube on a same side of the stop as the second rod, wherein each compression spring has opposite first and second ends, the first end of each compression spring applies outward pressure to a respective one of the rods, biasing the respective rod towards the extended position, and the stop engages the second end of each compression spring.

In another embodiment, the device comprises; first and second rods, each rod having first and second opposite ends, the first end of each rod being received by an opposite end of the tube; and a compression spring received within the tube in engagement with the first and second rods; wherein the compression spring applies outward pressure to each rod and biases each rod towards an extended position.

Preferably, the device further comprises a resilient material covering at least a portion of the outer surface of the tube, thereby providing a resilient surface to facilitate manual grasping of the device.

Preferably, each end of the device comprises a resilient material.

Preferably, each end of the device comprises a toilet bowl engaging tip.

Preferably, each tip comprises a resilient material.

Each tip may be removable from the device to allow replacement of the tip.

The device may be part of a kit that further comprises a plurality of toilet bowl engaging tips, each toilet bowl engaging tip arranged to be interchangeably fitted to an end of the device.

There may be provided a lift handle or lift ring joined to an outer surface of the device.

According to a second aspect of the invention, there is provided a method of lifting or transporting a toilet, the toilet having a bowl with a rim, said method comprising: (a) inserting a device according to the first aspect of the invention into the bowl of the toilet; (b) positioning the device such that the ends of the device engage opposite sides of the inner surface of the toilet bowl; and (c) exerting upward force on the device so as to lift the toilet and/or maintain the toilet in an elevated transport position.

Preferably step (b) comprises positioning the ends of the device beneath and proximal to the underside of the toilet bowl rim.

According to a third aspect of the invention, there is provided a method of lifting or transporting a toilet, the toilet having a bowl with a rim, said method comprising: (a) inserting a device having longitudinally separated ends into the bowl of the toilet; (b) positioning the device such that the ends of the device reside beneath the rim of the toilet at opposite sides of the toilet bowl; and (c) exerting upward force on the device so as to lift the toilet and/or maintain the toilet in an elevated transport position.

In either the second or third aspect of the invention, the upward force may be manually exerted on the device.

Alternatively, a lifting apparatus may be employed to exert upward force on the device.

According to a fourth aspect of the invention, there is provided a device to aid in lifting or transporting of a toilet, the toilet having a bowl with a rim, said device comprising a generally I-shaped member having a central handle portion and two rim-engaging portions lying cross-wise to a longitudinal dimension of the central handle portion at opposing ends thereof to engage under the rim of the toilet at opposing sides of the bowl for lifting or transport of the toilet by application of upward force on the central handle portion.

Preferably, the rim-engaging portions are curved at outer edges thereof that face away from the central handle portion.

Preferably, there is provided a retaining mechanism engaged or engagable to the handle portion of the generally I-shaped member and connectable to the toilet via at least one toilet-seat mounting-hole thereof in order to retain the generally I-shaped member to the toilet.

According to a fifth aspect of the invention, there is provided a device to aid in lifting or transporting of a toilet, the toilet having a bowl with a rim, said device comprising a handle of sufficient length to reach across the bowl of the toilet and place opposing ends of the handle beneath the rim of the toilet at opposing sides of the bowl, and a retaining mechanism engaged or engagable to the handle and connectable to the toilet via at least one toilet-seat mounting-hole thereof in order to retain the generally I-shaped member to the toilet.

In either the fourth or fifth aspect of the invention, the retaining mechanism preferably comprises at least one tie member for tied connection of the generally I-shaped member to the toilet through the at least one toilet seat mounting hole.

Preferably, the retaining mechanism comprises a pair of tie members that respectively tied to the toilet through a pair of toilet seat mounting holes therein.

BRIEF DESCRIPTION OF DRAWINGS

FIG. 12 depicts an overhead plan view of a seventh embodiment toilet lifting tool in an assembled state.

FIG. 13 is an exploded overhead plan view of the toilet lifting tool of FIG. 12.

FIG. 14 is an overhead plan view of a toilet on which the toilet lifting tool of FIG. 12 has been pre-installed by the toilet manufacturer.

DESCRIPTION

Figure 1:
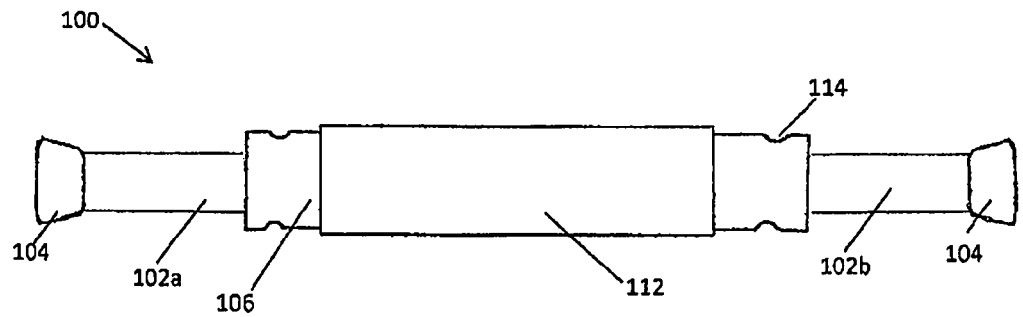
FIG. 1 depicts a side elevation view of a first embodiment of a toilet lifting tool of the disclosure.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. Further, where considered appropriate, reference numerals may be repeated among the figures to indicate corresponding or analogous elements.

Provided generally is a toilet lifting tool, also referred to herein as a toilet lifting device, comprising a longitudinally extendable and collapsible handle assembly. The toilet lifting tool is arranged to allow insertion of the tool into a toilet bowl. When the toilet lifting tool is installed into the toilet bowl, opposite ends of the tool engage the inner surface of the toilet bowl and/or the underside of the rim of the toilet bowl, with the tool extending horizontally across the bowl. Once installed within a toilet bowl, the tool can be used to lift the toilet by exerting upward force on the toilet lifting tool. When the toilet lifting tool is in an extended position, its length should be sufficient to reach from one side of the toilet bowl to an opposite side of the toilet bowl, across the inner width and/or length of the toilet bowl.

Figure 2:
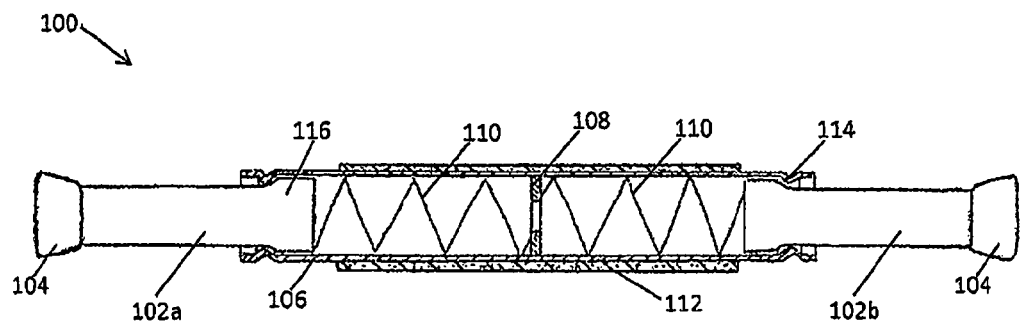
FIG. 2 depicts a partial cross-sectional view of the toilet lifting tool of FIG. 1.

An embodiment of a toilet lifting tool 100 is depicted in FIGS. 1 and 2. In this embodiment, the tool 100 comprises a tube 106 having opposite first and second ends longitudinally separated by the length of the tube 106. In this embodiment, the tool 100 further comprises first and second rods 102, which may be hollow or solid. A first end portion of the first rod 102a is slidably received within the first end of the tube 106 and a first end portion of the second rod 102b is slidably received within the second end of the tube 106. In an embodiment, the first end portion of each rod 102, received by the tube 106, is able to slide longitudinally relative to the length of the tube 106 but is retained within the tube 106 to prevent removal of the rod 102 from the tube 106. In an embodiment, the tube 106 comprises a retainer 114, for example a restriction in the wall of the tube 106 or a projection extending from the inner surface of the tube 106, that reduces the inner diameter of the tube 106 proximal to each end of the tube 106. Correspondingly, each rod 102 may comprise a retention portion 116, proximal to the end of the rod 102 that is housed within the tube, said retention portion 116 having an outer diameter that is sufficient to engage the retainer 114 and prevent the rod 102 from being removed from the tube 106. In the embodiment depicted in FIGS. 1 and 2, the retention portion 116 of rod 102 is a flared end, however other configurations may be employed. For example, the retention portion 116 may comprise one or more protrusions extending outward from the surface of the rod 102 or the retention portion 116 may comprise a section of rod 102 that is of a greater diameter than the main body of the rod 102.

In the embodiment depicted in FIGS. 1 and 2, the tool 100 further comprises a pair of compression springs 110 that longitudinally bias each rod 102 towards the respective end of tube 106. Each compression spring 110 is housed within tube 106 at a position intermediate between a stop 108 and a respective rod 102. The stop 108 is located within the tube 106 at a position intermediate between the ends of the tube 106. The stop 108 protrudes from the inner wall of the tube 106 and is arranged to engage an end of each compression spring 110. The stop 108 may extend fully across the inner diameter of tube 106 or the stop 108 may extend only partially across the inner diameter of tube 106. In the embodiment depicted in FIGS. 1 and 2, each compression spring 110 engages both the stop 108 and the first end of the rod 102. Each compression spring 110 is compressed between the stop 108 and the end of the respective rod 102, allowing each compression spring 110 to bias the respective rod 102 towards the extended position. Examples of a possible member usable as a stop for the abutment of the spring against it include a waster, a pipe nipple, or a ball bearing.

While the embodiment depicted in FIG. 1 comprises a single stop 108 that engages both compression springs 110, the tool may comprise two independent stops 108, each of which interacts with a different compression spring 110. In yet another embodiment, the tool 100 may be devoid of a stop and instead include a single compression spring 110 that is positioned within tube 106 at a position that is intermediate between the first ends of rods 102a and 102b. In this embodiment, the compression spring 110 applies outward pressure on the first end of each rod 102, biasing the rods 102a and 102b towards the extended position.

As depicted in FIGS. 1 and 2, the second end of each rod 102, i.e. the end of the rod not received within the tube 106, of the toilet lifting tool 100 may comprise a toilet engaging tip 104. In an embodiment, the toilet engaging tip 104 comprises a resilient material to prevent marring the finish of the toilet bowl and to allow the toilet engaging tip 104 to frictionally engage the surface of the toilet bowl. Examples of suitable materials include rubber materials. The shape and size of the toilet engaging tip 104 may be selected as desired to accommodate the shape of the bowl of the toilet with which the tool 100 is intended for use. For example, the toilet engaging tip 104 may be shaped to optimize engagement between the toilet engaging tip 104 and the underside of the toilet bowl rim. In an embodiment, the toilet engaging tips 104 may be removable from the tool 100 and interchangeable, allowing a user to select from a variety of tips 104 as desired to suit any particular toilet.

Figure 5:
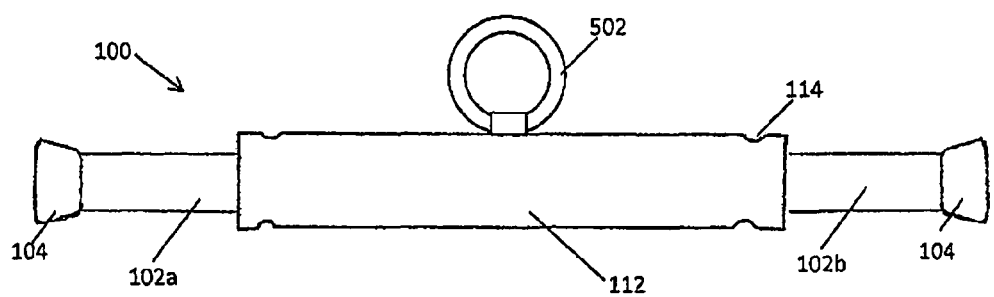
FIG. 5 depicts a side elevation view of a third embodiment of a toilet lifting tool of the disclosure.
Figure 8:
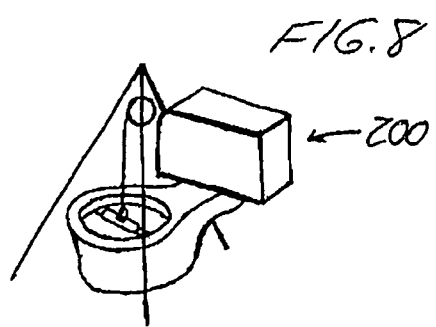
FIG. 8 schematically illustrates use of a tripod lift hoist being used to lift a toilet in cooperation with the third embodiment toilet lifting tool of FIG. 5.

The toilet lifting tool 100 may further comprise a handle grip 112 covering at least a portion of the surface of the tube 106 and/or encircling a portion of the tube 106 to facilitate grasping of the tool 100 by the hand of a user. In a further embodiment the tool 100 may comprise a lift ring 502, as depicted in FIG. 5, joined to the outer surface of the tube 106 to facilitate attaching the tube to a lifting apparatus, such as a frame or tripod having a lift arm, or a lift cable operated by a winch or hoist or pulley system. FIG. 8 schematically illustrates use of a tripod-mounted hoist to lift a toilet via the lift ring 502. Undesired tipping of the lifted toilet due to its uneven weight distribution may be prevented by connecting a strap, rope or other flexible tether between the tank of the toilet and the tripod or other framework of the lifting apparatus to stabilize the lifted toilet.

Figure 6:
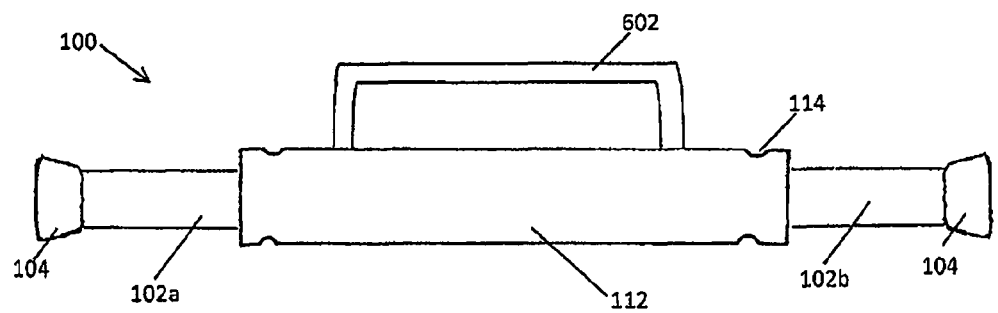
FIG. 6 depicts a side elevation view of a fourth embodiment of a toilet lifting tool of the disclosure.

In the embodiment depicted in FIGS. 1 and 2, the handle 112 is a resilient sleeve encircling a portion of tube 106. In other embodiments, the tool 100 may comprise a lift handle 602, as depicted in FIG. 6, extending from tube 106, allowing a user to lift the tool 100 by grasping the lift handle 602 without requiring the user to grasp the body of the tube 106.

The lift handle may be permanently fixed to the main tube 106, or selectively attachable and detachable therefrom for optional use. For example, the lift handle may be carried on hollow sleeve, flexible or rigid, having an inner diameter slightly larger than the outer diameter of the main tube 106 to allow easy installation and removal of the handle by sliding the handle-carrying sleeve onto and off of the main tube. When slid over the main tube, the handle-carrying sleeve can lift the tool from where it embraces or cradles the underside of same during manual raising of the lift handle from above. A lift ring may likewise be installed and removed from the tool using such a slide-on, slide-off ring-carrying sleeve.

In an embodiment, the tool 100 comprises a pair of rods 102 received within a tube 106 in a longitudinally slidable relationship, said rods 102 being biased towards an extended position by one or more compression springs 110. However, other longitudinally extendable arrangements may be employed. For example, the toilet lifting tool 100 may comprise a single rod 102 received within a tube 106, for example as depicted in FIG. 4.

Figure 4:
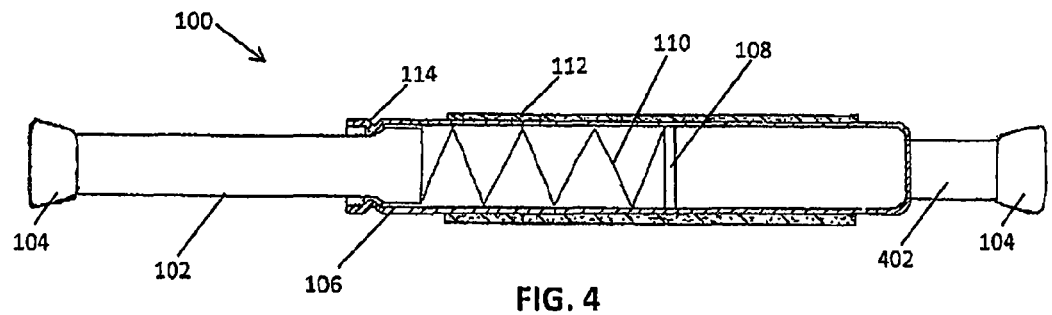
FIG. 4 depicts a partial cross-sectional view of a second embodiment of a toilet lifting tool of the disclosure.
Figure 7:
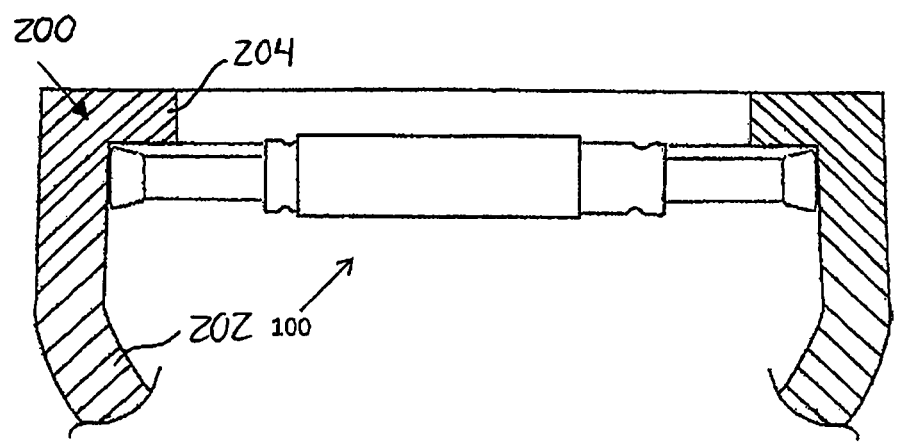
FIG. 7 depicts a partial cross-sectional view of a toilet bowl, with a toilet lifting tool installed across the width of the bowl.

In the embodiment depicted in FIG. 4, the tube 106 has an open rod-receiving end and an opposite closed end. Similar to the embodiment depicted in FIGS. 1 and 2, the rod 102 may be biased towards an extended position by a compression spring 110. The tool 100 may further comprise a stop 108, as shown in FIG. 4, or the compression spring 110 may extend from the closed end of the tube to the end of the rod 102 received by the tube 106. The tool 100 may further comprise a toilet engaging extension 402 joined to the closed end of the tube 106. In this embodiment, the extension 402 does not longitudinally extend or retract relative to the tube 106, but the extension 402 may comprise a toilet engaging tip 104. Together, the toilet engaging extension 402 and rod 102 are arranged to engage the inner surface of the toilet bowl and the lower side of the toilet bowl rim when the tool 100 is installed into the bowl of a toilet 200, as depicted in FIG. 7.

Figure 9:
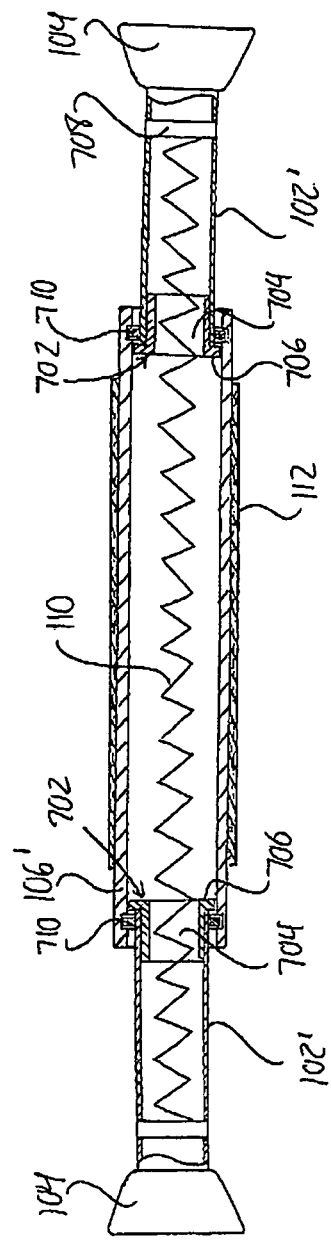
FIG. 9 depicts a partially cross-sectioned view of a fourth embodiment toilet lifting tool.

FIG. 9 shows a fourth embodiment of the toilet lifting tool, which like that of FIGS. 1 and 2, features two inner rods 102' each having a respective end thereof slidably disposed within the main tube 106' for telescopic movement of each inner rod between a normal extended position reaching furthest from the main tube, and a retracted position reaching further into the tube so as to extend a shorter distance from the respective end thereof. The drawing shows the tool in its fully extended state with the two inner rods spring-biased outward into their points of furthest extension from the main tube.

The fourth embodiment features only a single compression spring 110, the ends of which are respectively engaged with the first and second inner rods. More specifically, the coiled compression spring reaches inside each of the rods, both of which are hollow in this embodiment. The first end of each rod inside the main tube 106' is fitted with a shouldered insert 702 having a cylindrical through-bore 704 passing axially therethrough in concentric alignment with the cylindrical interior of the hollow rod 102'. A cylindrical portion of the insert fits inside the hollow interior of the rod 102' from the first end thereof. A flanged end of the insert remains just outside the rod 102' at the first end thereof within the hollow interior of the main tube 106'. Here, an annular flange 706 projects radially outward from the cylindrical remainder of the insert 702 by a radial distance reaching a short distance outwardly past the cylindrical exterior of the rod 102'. The outer or major coil diameter of the compression spring 110 is less than the inner diameter of the inserts 702 so as to accommodate reaching of the spring 110 into the hollow interior of each inner rod through the respective insert.

Near the second end of each hollow inner rod 102' at which the respective tip or cap 104 is carried, a respective spring pin 708 is received within a transverse through-bore passing diametrically through the rod in order to define a respective end stop against which a respective end of the single compression spring 110 can act. That is, each end of the compression spring 110 abuts against a respective one of the spring pins 708. Accordingly, the spring force biasing the two inner rods apart from one another into their extended positions is exerted agains the rods at these spring pins 708.

The spring pins may be replaced with other stop members, for example cotter pins or ball detent pins. In another embodiment, each rod 102' may be a closed-ended cylinder capped off at the second thereof by an end wall, in which case the spring pins or other diametric stops may be omitted in favour of having the compression spring instead act against the end wall of each inner rod. In another embodiment, the ends of the springs may abut directly against the inside of the tips or caps 104 that are fitted on the second ends of the inner rods, provided that the tips or caps are sufficiently secured so as not to pop off under the action of the spring when the tool is collapsed against the spring force.

Near each end of the main tube 106', a respective annular groove extends around the inner wall of the main tube and receives a respective o-ring 710 therein. The preferably identical o-rings have an inner diameter less than the outer diameter of the flanged end 706 of the preferably identical inserts 702 that are fixed to the inner ends of the preferably identical inner rods 102'. The cylindrical outer surface of each inner rod 102' is in sliding contact with the interior of the respective one of the o-rings 710. Teflon o-rings may be used to provide a self-lubricating solution that maintains a low-friction interface between the rod and the o-ring for a notable wear life without need for user-added lubrication. The o-rings maintain a close sliding fit between inner rods and main outer tube, and also act as retainers to prevent separation of the rods from the main tube by blocking outward passage of the flanged ends of the rod inserts past the o-rings toward the respective ends of the main tube. The embodiment of FIG. 9 thus lacks the tube wall construction 114 and the corresponding flared rod ends 116 of the tool shown in FIGS. 1 and 2.

In other embodiments, the toilet lifting tool 100 may lack a compression spring and may instead be maintainable in an extended position by a mechanism other than a compression spring; such as a twist and lock mechanism, a catch, or a ball detent locking mechanism. Suitable mechanisms will be readily understood by a person skilled in the art, as such mechanisms are commonly employed in various extendable/collapsible telescopic assemblies. In an embodiment, the rod or rods 102 may be unbiased and freely movable between the extended and retracted positions, where instead of the inner rods being automatically biased to their extended positions, the user manually performs relative sliding to achieve a desired overall length of the unit, whereupon the device is manually locked at such selected length, such as by a twist and lock mechanism, or automatically locked at the selected length, such as by a ball detent locking mechanism.

Figure 3:
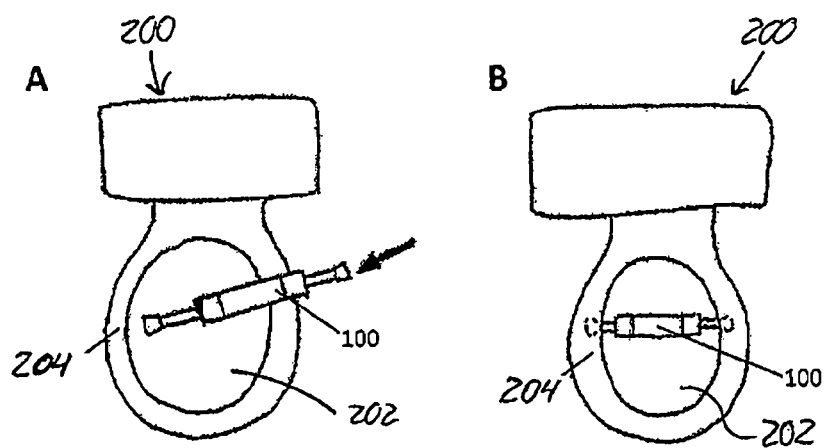
FIG. 3A depicts a toilet lifting tool being inserted into a toilet bowl.
FIG. 3B depicts the toilet lifting tool installed into a toilet bowl.

FIG. 3A depicts insertion of the toilet lifting tool 100 into a toilet bowl 202, while FIGS. 3B and 7 depict the toilet lifting tool 100 installed within a toilet bowl. To facilitate installation into a toilet bowl, the tool 100 may be longitudinally retracted into the retracted position by a user, for example by tipping one end of the tool down at an angle and forcing this lowered end of the tool against the toilet bowl at one side thereof under the toilet bowl rim 204, whereupon the tool is collapsed until short enough to allow lowering of the other end of the tool downward past the rim at a diametrically opposite point thereround. Releasing the manually applied forcing of the tool against the one side of the toilet bowl causes the tool to automatically extend, thus forcing both ends of the tool against the opposing points of the toilet bowl just beneath the trim thereof. Once so inserted into the toilet bowl, the tool 100 may be repositioned by a user to engage the inner surface of the toilet bowl at a particularly selected pair of opposing points, preferably positioned just below the rim of the toilet bowl as depicted in FIG. 7, so that the installed tool 100 engages both the inner surface of the toilet bowl and the underside of the rim of the toilet bowl. The tool 100 is intended to be inserted into a toilet bowl so that it extends across either the width or length of the toilet bowl. While the tool may be inserted in other orientations, placement of the tool 100 across either the width or length of the toilet bowl may balance the weight of the toilet 200 more evenly. Once the tool 100 is installed into the toilet bowl, the user may lift and/or transport the toilet by applying upward pressure to the tool 100. The upward pressure may be applied either manually or by using a lifting apparatus. Examples of suitable lift apparatuses include a frame or tripod having a lift arm, cable, or pulley system. Other suitable lift apparatuses will be readily understood to one skilled in the art. The user may further stabilize the toilet by using a free hand to stabilize the toilet tank while the toilet is being lifted and/or transported, or using the free hand to maintain an orientation of the overall toilet by supplementing the handle-aided lifting of the bowl with manual lifting or embracing of the tank.

Prototypes of the invention have employed off-the-shelf walking cane tips of circular cross section on the ends of the inner rods. However, other embodiments may employ tips of rectangular, square or other flat-sided cross-sectional shape in order to provide greater surface area contact of each tip with the underside of the toilet bowl rim, and thereby provide improved frictional engagement between the tip and the toilet bowl rim so as to better resist or avoid sliding or rolling of the tool along the underside of the rim during lifting of the toilet. While the illustrated embodiments employ a round tube of circular cross-section, and one or two round solid or hollow rods of circular cross-section slidably disposed therein, it will be appreciated other cross-sectional shapes may alternately be employed for these telescopically mated elements.

Figure 10:
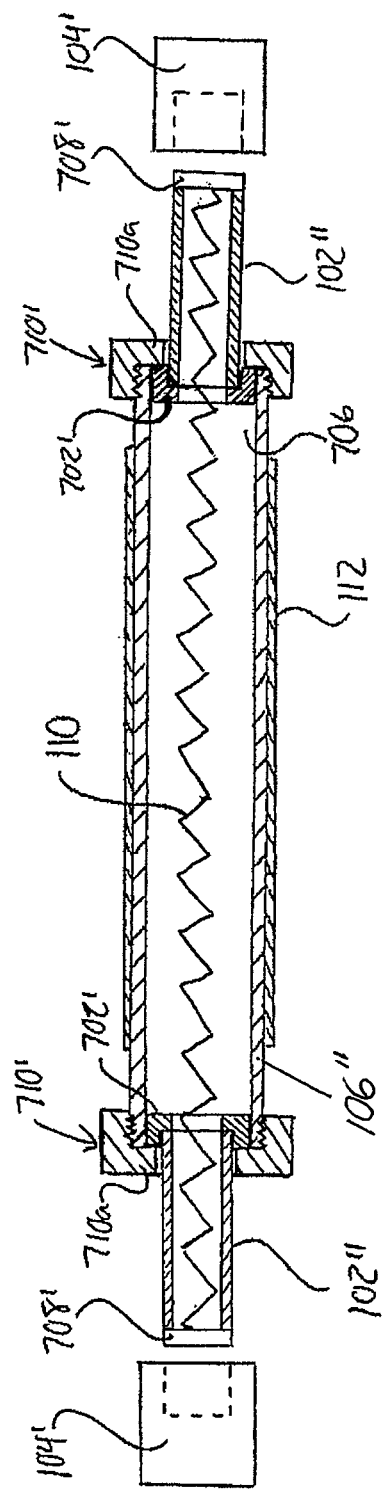
FIG. 10 depicts a partially cross-sectioned view of a fifth embodiment toilet lifting tool.

FIG. 10 shows another embodiment which is similar to that of FIG. 9, except that the flanged inserts 702 are replaced with internally-shouldered bushings 702' that are fitted externally onto on the inner rods 102", the o-rings 710 inside the main tube 106" are replaced with a larger pair of internally shouldered bushings 710' threaded externally onto the ends of the main tube 106", the spring pins 708 are replaced with flush-mounted end caps 708' that close off the outer ends of the inner rods 102", and the tapered tips 104 are replaced with square or rectangular block-shaped tips 104'.

The smaller bushings 702' are preferably fused, adhered or welded to the inner rods 102". Other methods of attaching the smaller bushing's may be employed, for example using a threaded connection like that employed for the removable larger bushings 710' on the main tube 106", but this may result in an undesirable increase in manufacturing cost. In some embodiments, the larger bushings may be permanently attached to the main tube by a fused, adhered or welded connection instead of a removable threaded connection, but use of at least one removable bushing allows disassembly of the device for service or repair.

The smaller shouldered bushings 702' each have a stepped-diameter through bore, which at a larger diameter portion thereof is large enough to accommodate receipt therein of the outer diameter of the respective inner rod 102". The smaller diameter portion of each smaller bushing's through-bore is greater in diameter than the spring 110, but smaller than the outer diameter of the rod 102" so as to abut up against the annular end face of the inner rod while allowing the spring to pass through the bushing and into the inner rod. The larger diameter portion of the bushing 702' that is fitted onto the inner rod 102" defines an annular flange projecting radially therefrom, in place of the flanged end of the insert 702 of the FIG. 9 embodiment.

The larger shouldered bushings 710' also each have a stepped-diameter through bore, which at a larger diameter portion thereof is internally threaded to mate with matching external threads on the respective end of the main tube 106". The smaller diameter portion of each larger bushing's through-bore is greater in diameter than the inner rods 102", but smaller in diameter than the smaller bushings 702' on the inner rods, and resides beyond the end of the main tube 106" so that this smaller-bored portion 710a of the collar 710' blocks the shouldered bushing 702' on the respective inner rod 102" from exiting the main tube 106". The two larger bushings 710' thus cooperate with the smaller bushings 702' to prevent the two inner rods from separating from the main tube 106".

Each block shaped tip 104' features a cylindrical blind-hole 104a extending thereinto from one end for fitting of the tip 104' onto the respective inner rod 102' over the outer end thereof that is closed off by the cap 708'. The spring 110 acts against the inside of the cap 708' in order to force the respective inner rod 102" into the extended position.

The FIG. 10 embodiment is notably easy to assemble. A respective small shouldered bushing 702' is fitted and secured onto an end of each inner rod 102" at the uncapped open end thereof, and one of the large shouldered bushings 710' is installed onto one end of the main tube 106" by way of its threaded connection. One of the two inner rods 102" is inserted capped-end-first into the main tube 106' from the end thereof opposite that on which the first larger bushing 710' has already been threaded. Then the spring 110 is inserted into the main tube 106" from this same end, thus feeding one end of the spring into the first inner rod 102" that has already been inserted into the main tube. The bushing-equipped end of the second inner rod 102" is then fitted over the exposed end of the spring 110, and pushed into the main tube against the spring force. The second large bushing 710' is then threaded onto the second end of the main tube 106", thus capturing the bushing-equipped end of the second inner rod therein. Finally, the two tips 104' are placed on the exposed outer ends of the two inner rods 102" that reside outside the main tube 106". The tips 104' may be secured solely by frictional fit, or with the aid of adhesive or other fastening means.

Figure 11:
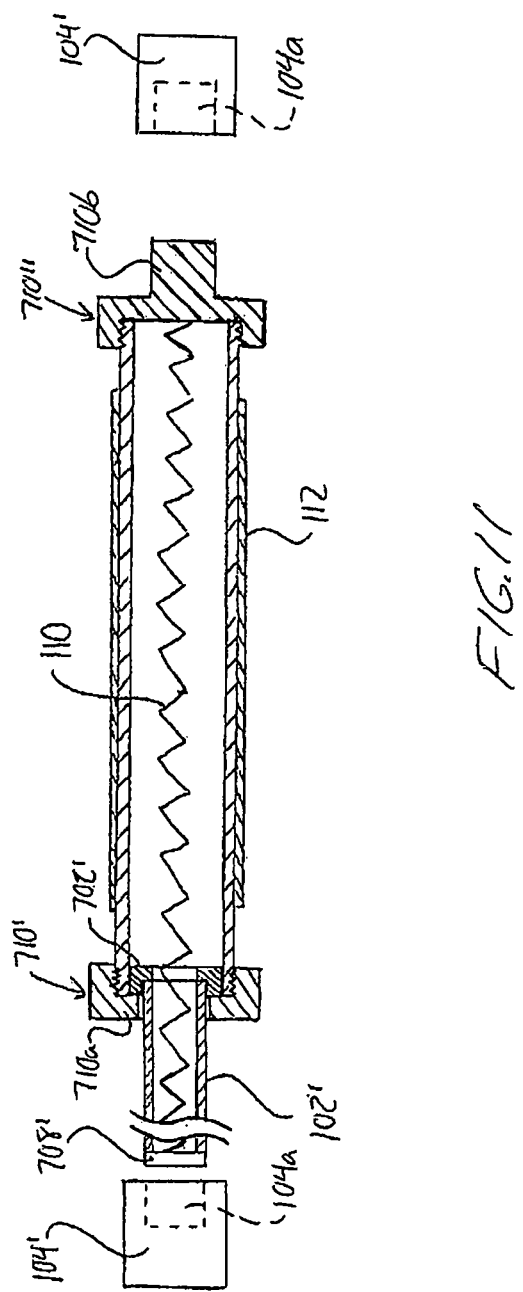
FIG. 11 depicts a partially cross-sectioned view of a sixth embodiment toilet lifting tool.

FIG. 11 shows another embodiment that features only a single spring-loaded end, much like the tool of FIG. 4, but employs a construction more similar to the double-ended tool of FIG. 10. The tool in FIG. 11 differs from the tool of FIG. 10 in that it features only one inner rod 102", and the large bushing at the end of the main tube 106" opposite that from which the single inner rod extends is replaced with a solid end cap 710", which is acted against by the end of the spring 110 that resides opposite the inner rod 102".

The single inner rod 102' of this embodiment, shown with indefinite length in FIG. 11, may be notably longer than each of the inner rods of the FIG. 10 embodiment, which are preferably equal in length to one another, and for example may have a length approximately equal to that of the main tube 106". The cap 710" features an axial protuberance 710b that lies concentric with the main tube 106", inner rod 102" and spring 110 and has an outer diameter equal to that of the inner rod 102", whereby the protuberance 710b fits within the cylindrical blind-hole 104a of the same type of block-shaped tip 104 that is mounted on the inner rod 102". The embodiment of FIG. 11 operates in the same manner as the single-ended tool of FIG. 4, but has ease-of-assembly benefits similar to the embodiment of FIG. 10, differing only in the lack of insertion of a second inner rod.

To assemble the tool of FIG. 11, a small shouldered bushing 702' is fitted and secured onto the uncapped open end of the inner rod 102", and one of the large shouldered bushings 710' is installed onto one end of the main tube 106" by way of a threaded connection. The inner rod 102" is inserted capped-end-first into the main tube 106' from the end thereof opposite that on which the first larger bushing 710' has already been threaded. Then the spring 110 is inserted into the main tube 106" from this same end, thus feeding one end of the spring into the inner rod 102". The solid end cap 710" is then threaded onto the second end of the main tube 106", thus capturing the spring 110 within the main tube 106". Finally, the two tips 104' are placed respectively on the protuberance 710b of the end cap 710" and the exposed outer end of the inner rod 102" that resides outside the main tube 106".

FIGS. 12 to 14 illustrate another embodiment of the present invention, in the form of a fixed-length, disposable, toilet-lifting tool 800 of the present invention. The tool features a handle piece 802 in the form of a flat, elongated rectangular board, and two end pieces 804 each lying cross-wise to the elongated handle piece 802, thus giving the overall device a generally I-shaped structure in plan view. The pieces are of relatively thin dimension in thickness relative to their other dimensions, for example being ¾-inch thick, whereby a user can wrap his or her hand around the handle piece 802 to perform a toilet-lifting operation.

Each end-piece 804 has the form of a segment-shaped or crescent-shaped piece from which a rectangular cut-out 806 has been made in the shorter edge 804a of the piece in order to accommodate receipt therein of a respective end of the handle piece 802. The longer curved edge 804b of the end piece 804 thus faces away from the handle piece 802. The rectangular cut-out 806 leaves a thinned-out portion 804c of the end-piece through which it can be fastened to the respective end of the handle piece 802, for example by staples 808, or other suitable fasteners such as nails or screws. The handle 802 and end pieces 804 may be made of the same or different materials, which may include wood, plastic, relatively rigid paperboard product (e.g. that used to create packaging corners for furniture, fixtures, appliances and the like). Recyclable materials may be employed, and the tool may be formed from previously recycled material.

With reference to FIG. 14, the tool 800 is installed by the toilet manufacturer prior to packaging and shipping, whereby the toilet installer will be able to use the factory-installed tool to maneuver the toilet, and then remove and discard of the disposable tool once installation of the toilet is completed. The tool is inserted into the toilet bowl, for example by lowering it one end piece 804 at a time into the toilet bowl under the rim thereof with the handle 802 lying along an elongated dimension of the bowl (i.e. the direction in which the bowl extends outwardly away from the tank of the toilet), and then turning the tool into the illustrated cross-wise orientation instead lying across the toilet bowl in the shorter width direction. This places the two end pieces 804 at opposing sides of the toilet bowl beneath the rim thereof. Two plastic zip ties 810 are then used to secure the tool 800 in this position by tying each zip tie into a closed loop passing through a respective one of two toilet seat mounting holes 206 of the toilet and wrapping around a front edge of the handle piece 802. Tightening of the two zip ties in this position pulls the handle. 800 toward the rear of the toilet bowl, thus wedging the curved outer edges 804b of the end pieces against the opposing sides of the toilet bowl and thereby preventing movement of the tool out of this installed position.

When an installer has completed the installation of the toilet, and thus no longer requires the tool for lifting and maneuvering the toilet, he or she simply cuts the two plastic zip ties 810, at which point the tool can be twisted and turned out of its installed position hooked beneath the toilet bowl rim at the opposing sides thereof and withdrawn from the toilet bowl. The factory-installed lifting tool can then be disposed of.

Flexible ties other than zip ties may be employed to similarly define a retaining mechanism that secures the tool to the toilet in the manufacturer-installed position using the toilet-seat mounting holes of the toilet, for example by tying the tool in place through the mounting holes using lengths of string or twine. Instead of looping the ties around the handle piece 802 of the tool 800, another option includes the provision of holes in the handle piece, through which the ties can be fed in order to engage the ties with the tool.

From comparison of the embodiment of FIGS. 12 to 14 with the other embodiments described, above, it will be appreciated that the present invention provides both higher-cost, extendable-collapsible, robust tools for marketing to plumbers and installers who will have an ongoing need for regular use of a such a tool, and lower cost factory-installed solutions that can be implemented by toilet manufacturers to provide a convenient toilet-lifting solution for use not only by professional plumbers and installers, but also by do-it-yourself homeowners that would not have justification for purchase of a higher-grade toilet lifting tool due to the infrequent need for such an implement. Although the embodiment of FIGS. 12 to 14 is described as being disposable, it could likewise also serve as a low-cost, fixed size repeat-use tool with no moving parts, but without the same flexibility as the extendable and collapsible tools of the other embodiments, which have the advantage of greater flexibility in accommodating the different sizes and shapes of toilets.

The extendable-retractable tools intended for long-term repeated use are preferably made of a suitable long-lasting material of notable strength and durability, such as aluminum, stainless steel, or other metal, but also be made of other materials, such as a relatively hard, rigid plastic providing sufficient strength to handle the weight load expected during use on a variety of toilets of different size and shape.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments.

Further, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting. It will be understood by persons skilled in the art that other variants and modifications may be made without departing from the scope of the invention as defined in the appended claims.

What is claimed is:

1. A method of lifting or transporting a toilet comprising:
   (a) obtaining a device comprising (i) a handle assembly that is longitudinally extendable and collapsible between an extended position and a collapsed position, and (ii) opposite ends separated by the length of the handle assembly;
   (b) positioning the device such that the ends of the device engage a bowl of the toilet at an inner surface or rim thereof at opposite sides of the bowl with the handle assembly in the extended position; and
   (c) exerting upward force on the device so as to lift the toilet and/or maintain the toilet in an elevated position.

2. The method of claim 1 wherein the handle assembly is biased towards the extended position.

3. The method of claim 2 wherein the device comprises:
   (a) a tube;
   (b) a rod, said rod having a first end received within the tube and a second end external to the tube; and
   (c) a compression spring housed within the tube, said compression spring having opposite first and second ends,
   wherein the first end of the compression spring engages the rod,
   wherein the rod is longitudinally slidable along the length of the tube between a retracted position and an extended position, and
   wherein the compression spring biases the rod towards the extended position.

4. The method of claim 3, wherein the device further comprises a stop located within the tube at a position intermediate between the ends of the tube, said stop arranged to engage the second end of the compression spring.

5. The method of claim 3, wherein the device comprises:
   first and second rods, each rod having first and second opposite ends, the first end of the first rod being received by a first end of the tube and the first end of the second rod being received by a second end of the tube;
   a stop, said stop located within the tube at a position intermediate between the first and second ends of the tube; and
   first and second compression springs, the first compression spring located within the tube on a same side of the stop as the first rod and the second compression spring located within the tube on a same side of the stop as the second rod, wherein
   each compression spring has opposite first and second ends,
   the first end of each compression spring applies outward pressure to a respective one of the rods, biasing the respective rod towards the extended position, and
   the stop engages the second end of each compression spring.

6. The method of claim 3, wherein the device comprises:
   first and second rods, each rod having first and second opposite ends, the first end of each rod being received by an opposite end of the tube;
   wherein the compression spring is in engagement with the first and second rods;
   wherein the compression spring applies outward pressure to each rod and biases each rod towards an extended position.

7. The method of claim 3, wherein the device further comprises a resilient material covering at least a portion of the outer surface of the tube, thereby providing a resilient surface to facilitate manual grasping of the device.

8. The method of claim 1, wherein the handle assembly is a telescopic handle assembly.

9. The method of claim 1, wherein each end of the device comprises a resilient material.

10. The method of claim 1, wherein each end of the device comprises a toilet bowl engaging tip.

11. The method of claim 10, wherein each tip comprises a resilient material.

12. The method of claim 10, wherein each tip is removable from the device to allow replacement of the tip.

13. The method of claim 1, further comprising a lift handle or lift ring joined to an outer surface of the device.

14. The method of claim 1 wherein the upward force is manually exerted on the device by manually grasping and lifting the handle assembly at a location between the ends of the device.

15. A method of lifting or transporting a toilet comprising: (a) obtaining a hand-held device comprising a generally I-shaped member having a central handle portion and two rim-engaging portions lying cross-wise to a longitudinal dimension of the central handle portion at opposing ends thereof, (b) positioning said device to place said rim-engaging portions in engagement under the rim of the toilet at opposing sides of the bowl; and (c) manually lifting the toilet by manually grasping said central handle portion and manually applying upward force directly on the central handle portion to lift the toilet upwardly on said rim-engaging portions.

16. The method of claim 15 wherein the rim-engaging portions are curved at outer edges thereof that face away from the central handle portion.

17. The method of claim 15 wherein the device further comprises a retaining mechanism engaged to the handle portion of the generally I-shaped member and engaged to the toilet via at least one toilet seat mounting hole thereof in a tightened state pulling said I-shaped member toward a rear of the bowl and thereby wedging the rim engaging portions of said I-shaped member against the opposing sides of the bowl in order to retain the generally I-shaped member to the toilet.

18. The method of claim 17 wherein the retaining mechanism comprises at least one tie member tied in a closed loop through the at least one toilet seat mounting hole.

19. The method of claim 18 wherein the hand-held device consists only of said at least one tie member, and said handle portion and said rim-engaging portions of said generally I-shaped member.

20. The method of claim 15 wherein the hand-held device consists only of said handle portion and said rim-engaging portions of said generally I-shaped member.

21. A method of lifting or transporting a toilet comprising: (a) obtaining a hand-held device comprising an elongated handle and a pair of securing members engaged to the handle; (b) connecting said securing members to the toilet via two toilet seat mounting holes thereof to secure the handle to the toilet in a position lying cross-wise to a bowl of the toilet and (c) manually raising the toilet via manual grasping and lifting of said handle.

22. The method of claim 21 wherein the hand-held device consists only of said elongated handle and said pair of securing members.

23. A method of lifting or transporting a toilet comprising:
   (a) obtaining a device comprising:
   (i) a handle assembly; and
   (ii) a pair of toilet engaging members connected or connectable to the handle assembly in spaced apart positions separated from one another in a longitudinal direction of the handle assembly;

the handle assembly being arranged to movably support at least one of the toilet engaging members to enable selective movement of said one of the toilet engaging members relative to the other one of said toilet engaging members in the longitudinal direction between an extended position further from said other one of the toilet engaging members and a retracted position nearer to said other one of the toilet engaging members;

(b) positioning the device to place the pair of toilet engaging members in engagement with an inner surface or rim of a bowl of said toilet at opposing sides thereof with said at least one of the toilet engaging members in the extended position; and (c) at a location between said spaced apart positions of the toilet-engaging members, manually grasping the handle assembly and raising the toilet via manual lifting of said handle at said location.

24. A device to aid in lifting or transporting of a toilet, said device comprising:

a handle assembly arranged to carry a pair of installed toilet engaging members at respective positions spaced longitudinally apart from one another on said handle assembly; and multiple sets of toilet engaging members, each set comprising a respective pair of toilet engaging members that differ from the toilet engaging members of each other set, said multiple sets of toilet engaging members being interchangeable for one another in the installed positions on said handle assembly.

25. The device of claim 24 wherein the handle assembly is arranged to movably support at least one of the installed toilet engaging members to enable selective movement of said one of the installed toilet engaging members relative to the other one of said installed toilet engaging members in the longitudinal direction between an extended position further from said other one of the installed toilet engaging members and a retracted position nearer to said other one of the installed toilet engaging members.

26. The device of claim 25 wherein the multiple sets of toilet engaging members comprise a pair of toilet engaging tips useable as the installed pair of toilet engaging members, said toilet engaging tips being arranged to engage an inner surface of a toilet bowl and/or to engage an underside of the rim of the toilet bowl when said at least one of the installed toilet engaging members is in the extended position.

27. The device of claim 24 wherein the multiple sets of toilet engaging members comprise a pair of toilet engaging tips arranged to engage an inner surface of a toilet bowl and/or to engage an underside of the rim of the toilet bowl when said at least one of the toilet engaging members is in the extended position.

* * * * *